(12) United States Patent
Yasuda

(10) Patent No.: US 12,254,198 B2
(45) Date of Patent: Mar. 18, 2025

(54) MEMORY SYSTEM AND CONTROL METHOD INVOLVING MULTIPLE BLOCK SETS

(71) Applicant: Kioxia Corporation, Tokyo (JP)

(72) Inventor: Tetsuya Yasuda, Kamakura Kanagawa (JP)

(73) Assignee: Kioxia Corporation, Tokyo (JP)

( * ) Notice: Subject to any disclaimer, the term of this patent is extended or adjusted under 35 U.S.C. 154(b) by 94 days.

(21) Appl. No.: 18/114,538

(22) Filed: Feb. 27, 2023

(65) Prior Publication Data

US 2023/0315310 A1 Oct. 5, 2023

(30) Foreign Application Priority Data

Apr. 5, 2022 (JP) .................. 2022-063074

(51) Int. Cl.
*G06F 3/06* (2006.01)
(52) U.S. Cl.
CPC .......... *G06F 3/0631* (2013.01); *G06F 3/0619* (2013.01); *G06F 3/0652* (2013.01); *G06F 3/0679* (2013.01)
(58) Field of Classification Search
CPC .... G06F 3/0619; G06F 3/0631; G06F 3/0652; G06F 3/0679; G06F 3/064
See application file for complete search history.

(56) References Cited

U.S. PATENT DOCUMENTS

| 9,626,289 B2 | 4/2017 | Chen et al. |
| 10,754,771 B2 | 8/2020 | Yasuda |
| 11,366,751 B2 | 6/2022 | Yasuda |
| 11,733,878 B1 * | 8/2023 | Horn ........................ G06F 3/064 |
| | | 711/154 |
| 2008/0052446 A1 * | 2/2008 | Lasser ................ G06F 12/0246 |
| | | 711/E12.008 |
| 2019/0294335 A1 * | 9/2019 | Kim ........................ G06F 3/061 |
| 2020/0192583 A1 | 6/2020 | McClain et al. |

FOREIGN PATENT DOCUMENTS

JP 2020-017134 A 1/2020

* cited by examiner

*Primary Examiner* — Jane W Benner
(74) *Attorney, Agent, or Firm* — Foley & Lardner LLP

(57) ABSTRACT

According to one embodiment, a memory system includes a non-volatile memory including a plurality of physical blocks and a controller. The controller is configured to allocate the plurality of physical blocks to a plurality of first block sets each including physical blocks among the plurality of physical blocks, generate a plurality of groups obtained by grouping the plurality of first block sets by the number of defective physical blocks included in each of the plurality of first block sets, and select a plurality of the first block sets from at least two groups of the plurality of groups to generate a second block set from the plurality of selected first block sets.

22 Claims, 15 Drawing Sheets

FIG.4

| MB Index | PB indexes | | | | Erase Count | MB LinkedList | |
|---|---|---|---|---|---|---|---|
| | 0 | 1 | 2 | 3 | | Prev | Next |
| 0 | PB #0 | Defect | PB #2 | PB #3 | 1 | null | null |
| 1 | PB #4 | PB #5 | PB #6 | PB #7 | 1 | null | MB #5 |
| 2 | PB #8 | PB #9 | Defect | Defect | 2 | null | MB #p |
| 3 | PB #12 | PB #13 | PB #14 | PB #15 | 2 | MB #5 | null |
| 4 | PB #16 | Defect | PB #18 | PB #19 | 2 | null | null |
| 5 | PB #20 | PB #21 | PB #22 | PB #23 | 1 | MB #1 | MB #3 |
| ... | | | | | | | |
| P | PB #m | Defect | Defect | PB #m+3 | 3 | MB #2 | null |
| ... | | | | | | | |
| MB_max | | | | | | | |

FIG.5

| CB Index | MB indexes ||
| --- | --- | --- |
|  | 0 | 1 |
| 0 | MB #0 | MB #4 |
| 1 | MB #n | MB #m |
| 2 | null | null |
| ... |||
| CB_max |  |  |

FIG.6

| FB index | Defect | MB LinkedList | |
|---|---|---|---|
| | | Head | Tail |
| 0 | 0 | MB #1 | MB #3 |
| 1 | 1 | | |
| 2 | 2 | MB #2 | MB #p |
| ... | | | |
| FB_max | FB_max | | |

MEMORY SYSTEM AND CONTROL METHOD INVOLVING MULTIPLE BLOCK SETS

CROSS-REFERENCE TO RELATED APPLICATIONS

This application is based upon and claims the benefit of priority from Japanese Patent Application No. 2022-063074, filed on Apr. 5, 2022; the entire contents of which are incorporated herein by reference.

FIELD

Embodiments described herein relate generally to a memory system and a control method.

BACKGROUND

In recent years, solid state drives (SSDs) have been known as one type of memory systems. SSDs are used as main storage for various computing devices.

A non-volatile memory includes a plurality of physical blocks. A memory system generates sets of physical blocks each including a plurality of physical blocks to implement parallel access to the non-volatile memory and generate correction codes.

BRIEF DESCRIPTION OF THE DRAWINGS

FIG. 4 is a diagram illustrating a configuration of a media block table in the memory system according to the first embodiment;

FIG. 5 is a diagram illustrating a configuration of a composition block table in the memory system according to the first embodiment;

FIG. 6 is a diagram illustrating a configuration of a free block list in the memory system according to the first embodiment;

DETAILED DESCRIPTION

According to one embodiment, a memory system includes a non-volatile memory including a plurality of physical blocks and a controller. The controller is configured to allocate the plurality of physical blocks to a plurality of first block sets each including physical blocks among the plurality of physical blocks, generate a plurality of groups obtained by grouping the plurality of first block sets by the number of defective physical blocks included in each of the plurality of first block sets, and select a plurality of the first block sets from at least two groups of the plurality of groups to generate a second block set from the plurality of selected first block sets.

Exemplary embodiments of a memory system and a control method will be explained below in detail with reference to the accompanying drawings. The present invention is not limited to the following embodiments.

First Embodiment

Figure 1:
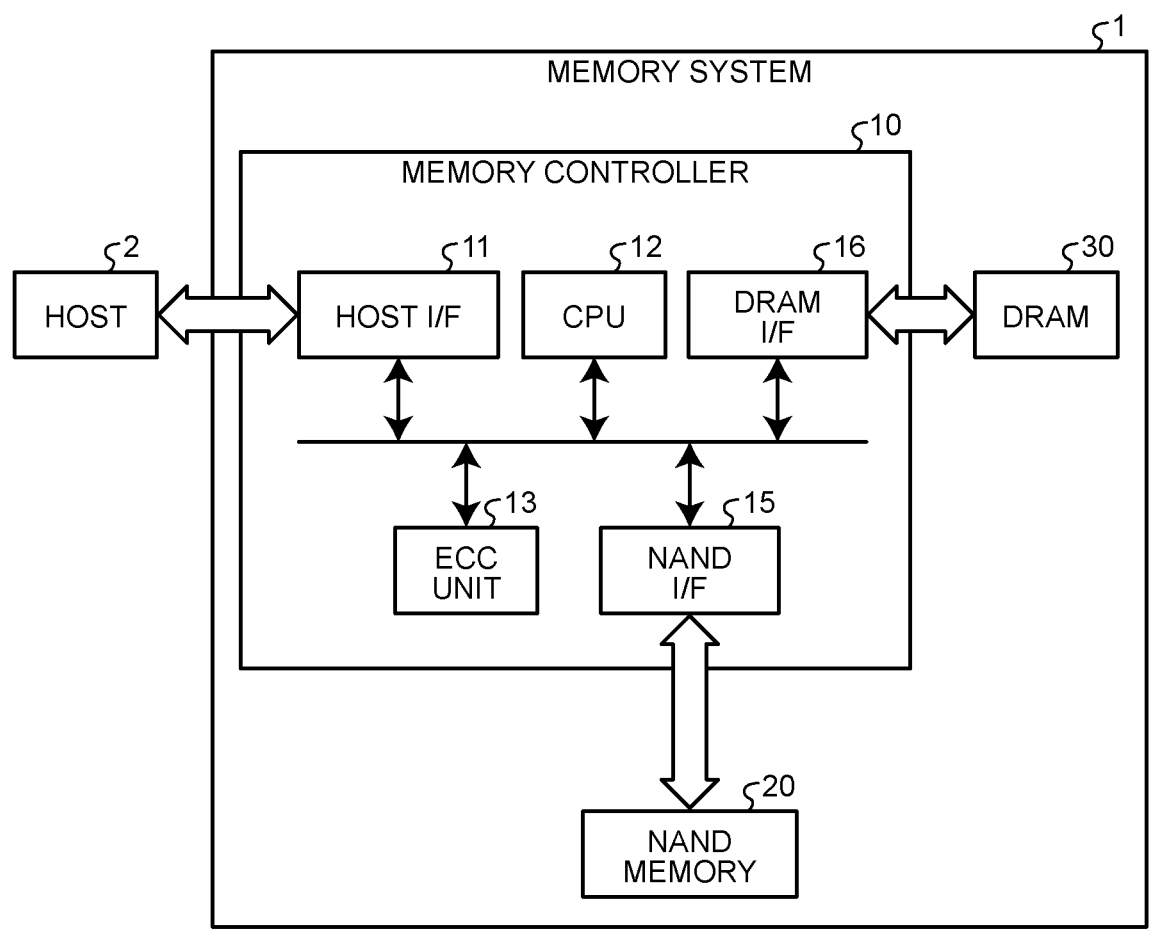
FIG. 1 is a diagram illustrating an example of a configuration of a memory system according to a first embodiment.

FIG. 1 is a diagram illustrating an example of a configuration of a memory system 1 according to a first embodiment. As illustrated in FIG. 1, the memory system 1 includes a memory controller 10, a NAND flash memory 20 (hereinafter, referred to as "NAND memory 20"), and a dynamic random access memory (DRAM) 30. The memory controller 10 is connected to the NAND memory 20 and the DRAM 30. The memory system 1 may be a memory card or the like in which the memory controller 10 and the NAND memory 20 are configured as one package, or may be a solid state drive (SSD) or the like. The memory system 1 can be connected to a host 2. FIG. 1 illustrates a state in which the memory system 1 is connected to the host 2.

The memory controller 10 includes a host interface (I/F) 11, a CPU 12, an error correcting code (ECC) unit 13, a NAND interface (I/F) 15, and a DRAM interface (I/F) 16. The host I/F 11, the CPU 12, the ECC unit 13, the NAND I/F 15, and the DRAM I/F 16 are mutually connected by an internal bus.

The memory controller 10 may be configured as, for example, a system on a chip (SoC). The memory controller 10 may include a field programmable gate array (FPGA) or an application specific integrated circuit (ASIC). The memory controller 10 can command the NAND memory 20 to perform various operations. The memory controller 10 executes an operation based on a request from the external host 2 and an operation independent of the request from the host 2. Each function of the memory controller 10 may be realized by a central processing unit (CPU) that executes a program, or may be realized by dedicated hardware.

The host I/F 11 is connected to the host 2 and is responsible for communication between the memory system 1 and the host 2. The host I/F 11 controls transfer of data, requests, and addresses between the memory system 1 and the host 2, for example. The host I/F 11 performs processing according to the communication interface standard with the host 2. The host I/F 11 receives various requests from the host 2. The request here is a request for writing data to the NAND memory 20 or a request for reading data from the NAND memory 20. The host I/F 11 receives an address of an access destination and data to be written from the host 2. The host I/F 11 transmits the data read from the NAND memory 20 to the host 2.

The CPU 12 controls the entire operation of the memory controller 10. For example, the CPU 12 issues a write command in response to a write processing request received from the host 2, and transmits the issued write command to the NAND memory 20 via the NAND I/F 15. The CPU 12 issues a read command in response to a read request received from the host 2, and transmits the issued read command to the NAND memory 20 via the NAND I/F 15. The CPU 12 issues an erase command in response to an erase request received from the host 2, and transmits the issued erase command to the NAND memory 20 via the NAND I/F 15.

The ECC unit 13 encodes data to generate a parity for error detection and correction, and generates a code word including the data and the parity. For example, the ECC unit 13 receives data in a predetermined unit from the CPU 12, encodes the received data, and generates a parity to generate a code word. The ECC unit 13 decodes the code word read from the NAND memory 20 to restore data. When there is an error in the data read from the NAND memory 20, the ECC unit 13 performs error correction and restores the data.

The ECC unit 13 encodes data and generates an ECC (that is, parity) corresponding to the data. The ECC unit 13 may generate ECCs that are linear codes. A plurality of ECCs that are linear codes can be subtracted from each other, that is, an exclusive OR (XOR) operation can be performed. As such ECCs, for example, Reed-Solomon (RS) codes or XOR parities are used.

The NAND I/F 15 is responsible for communication with the NAND memory 20. The NAND I/F 15 is configured based on the NAND interface standard.

The DRAM I/F 16 is responsible for communication with the DRAM 30. The DRAM I/F 16 is configured based on the DRAM interface standard. The DRAM 30 has an area that stores various tables.

The NAND memory 20 as a non-volatile memory includes a memory cell array. The memory cell array includes a plurality of memory cells arranged in a matrix. The memory cell array of the NAND memory 20 includes a plurality of physical blocks. The NAND memory 20 may include a plurality of non-volatile memory chips (for example, a plurality of NAND flash memory dies). The NAND memory 20 may be a non-volatile memory having a two-dimensional structure or a non-volatile memory having a three-dimensional structure.

Figure 2:
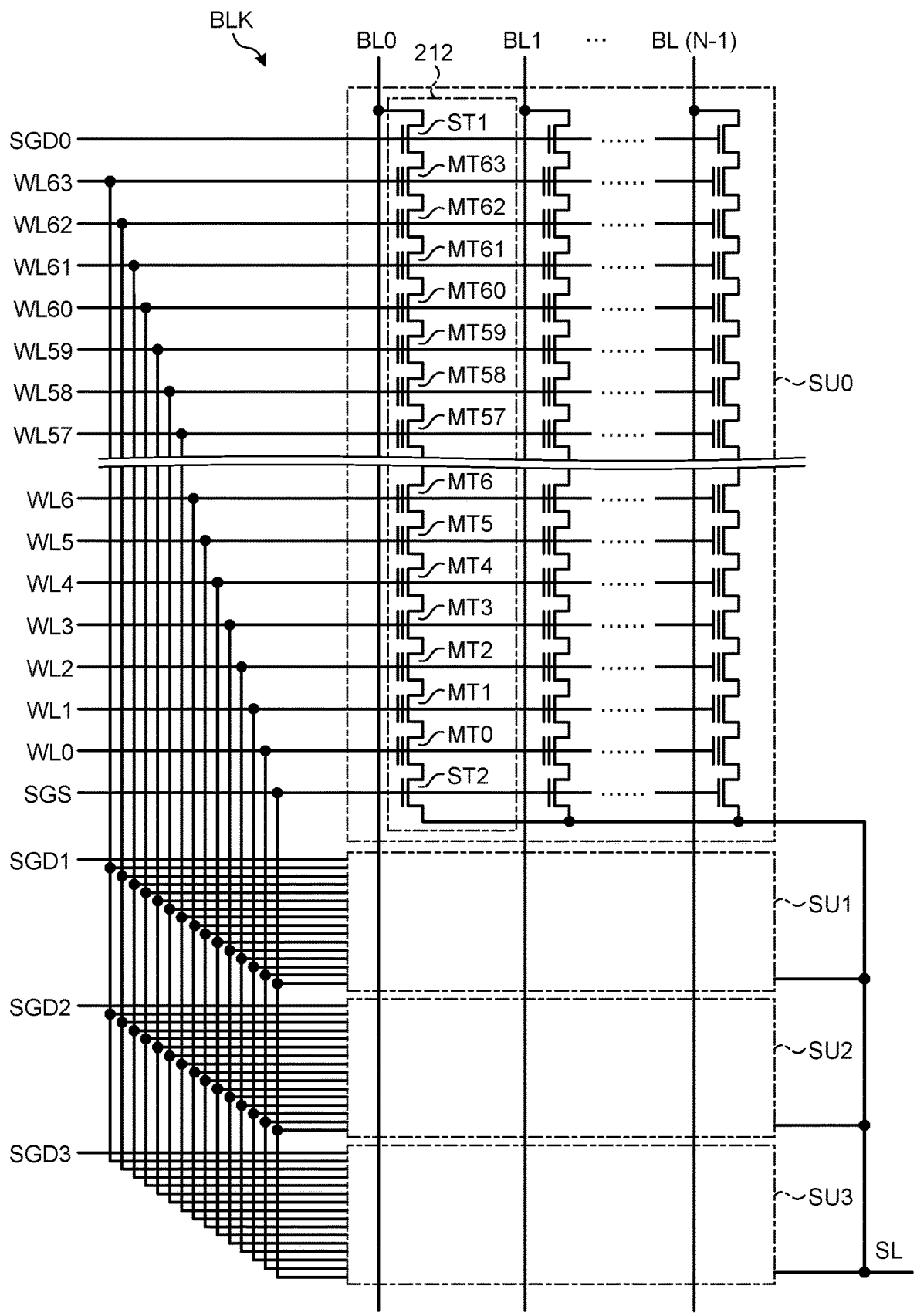
FIG. 2 is a circuit diagram illustrating a configuration of a memory cell array of the memory system according to the first embodiment.

FIG. 2 is a circuit diagram illustrating a configuration example of one block. Each physical block BLK has the same configuration. The physical block BLK includes, for example, four string units SU0 to SU3. Each string unit SU includes a plurality of NAND strings 212.

Each of the NAND strings 212 includes, for example, 64 memory cell transistors MT (MT0 to MT63) and select transistors ST1 and ST2. The memory cell transistors MT include a control gate and a charge storage layer and hold data in a non-volatile manner. The 64 memory cell transistors MT (MT0 to MT63) are connected in series between the source of the select transistor ST1 and the drain of the select transistor ST2. The memory cell transistors MT may be a MONOS type using an insulating film for their charge storage layers, or may be an FG type using a conductive film for their charge storage layers. The number of memory cell transistors MT in the NAND string 212 is not limited to 64.

The gates of the select transistors ST1 in the string units SU0 to SU3 are connected to the select gate lines SGD0 to SGD3, respectively. The gates of the select transistors ST2 in the string units SU0 to SU3 are commonly connected to, for example, a select gate line SGS. The gates of the select transistors ST2 in the string units SU0 to SU3 may be connected to select gate lines SGS0 to SGS3 (not illustrated) different for each string unit SU. The control gates of the memory cell transistors MT0 to MT63 in the same block BLK are commonly connected to the word lines WL0 to WL63.

The drains of the select transistors ST1 of the NAND strings 212 in each string unit SU are respectively connected to different bit lines BL (BL0 to BL(N−1), where N is a natural number of 2 or more). The bit lines BL commonly connect one NAND string 212 in each string unit SU between a plurality of blocks BLK. Further, the sources of the select transistors ST2 are commonly connected to a source line SL.

That is, the string unit SU is a set of a plurality of NAND strings 212 each connected to a different bit line BL and connected to the same select gate line SGD. The block BLK is a set of a plurality of string units SU sharing the word lines WL. The memory cell array is a set of a plurality of physical blocks BLK sharing at least one bit line BL.

Write and read may be collectively executed for the memory cell transistors MT connected to one word line WL in one string unit SU. A group of memory cell transistors MT selected collectively at the time of write and read is referred to as a memory cell group. A unit of a collection of 1-bit data to be written or read in one memory cell group is referred to as a page.

Erase is executed in units of physical blocks BLK. That is, all the data stored in one block BLK is erased collectively.

The memory system 1 writes data into the NAND memory 20 in response to a request from the host 2. Writing of data into the NAND memory 20 by the memory system 1 is referred to as write processing. In the write processing, in response to the write processing request from the host 2, the memory controller 10 transmits a write command and data associated with the write processing request to the NAND memory 20 via the NAND I/F 15. The NAND memory 20 writes the received data into the memory cell array.

The memory system 1 erases the data written in the NAND memory 20. Erasing the data written in the NAND memory 20 by the memory system 1 is referred to as erase processing. In the erase processing, the memory controller 10 transmits an erase command to the NAND memory 20 via the NAND I/F 15. The NAND memory 20 erases data in the memory cell array based on the received erase command.

In the present embodiment, when data is written into the NAND memory 20, a set of a plurality of blocks BLK of the NAND memory 20 is handled as one write unit to generate a parity. This write unit is referred to as a composition block. The composition block includes a plurality of media blocks. Each media block includes a plurality of physical blocks BLK. The number of media blocks included in the composition block is determined by the memory controller 10.

Figure 3:
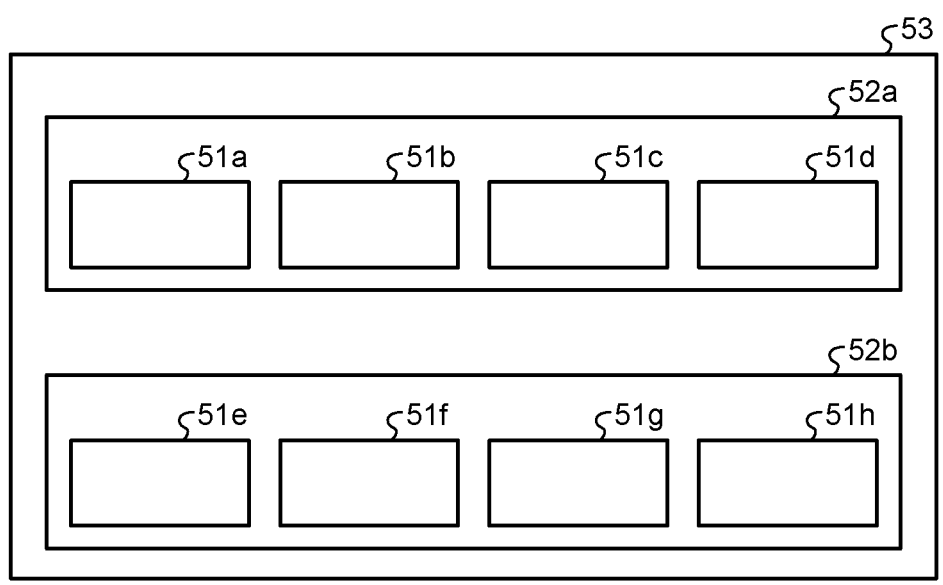
FIG. 3 is a diagram for describing a configuration of a memory block in the memory system according to the first embodiment.

FIG. 3 is a block diagram illustrating a relationship between the composition block, the media blocks, and the physical blocks. A media block 52 is a block in which one physical block is selected from each plane which is a parallel operation element for realizing parallel access. Here, one media block 52 includes four physical blocks BLK51. For example, a media block 52a includes physical blocks 51a to 51d. The media block 52 is an example of a first block set. Hereinafter, the plurality of media blocks 52a and 52b are referred to as media blocks 52 when they are not distinguished from each other. The physical blocks 51a to 51d are referred to as physical blocks 51 when they are not distinguished from each other.

When the memory system 1 is activated for the first time before shipment or after shipment, a correspondence relationship between the physical blocks 51 and the media blocks 52 is set. The setting of the correspondence relationship is stored in the NAND memory 20 in a non-volatile manner, for example. The CPU 12 enqueues all media blocks 52 into a free block list. Here, the free block list refers to a list of physical blocks 51 in which valid data is not stored. When the memory system 1 is activated for the first time, the physical blocks 51 associated with the media blocks 52 are in an erased state.

A composition block 53 is a block in which a plurality of media blocks 52 are selected to combine physical blocks 51 by the correction code length. Here, one composition block 53 includes two media blocks 52a and 52b. The memory system 1 includes a plurality of composition blocks 53. In the present embodiment, the erase processing can be performed in units of composition blocks, which is normally performed in units of physical blocks BLK. The composition block 53 is an example of a second block set. At the time of the write processing, the CPU 12 dequeues the media blocks 52 from the free block list and allocates the composition block 53. Hereinafter, the allocation is referred to as generating. The number of the media blocks 52 in the composition block 53 is determined by the memory controller 10. Each of the plurality of composition blocks 53 has the same number of media blocks 52.

In the present embodiment, all composition blocks 53 have the same number of media blocks 52, but the number of the media blocks 52 is not limited to this configuration. For example, the number of media blocks 52 included in each composition block 53 may be reduced. In this case, the size of the parity included in the composition block 53 becomes small.

Meanwhile, there is a possibility that the media blocks 52 have a defective physical block which is a physical block 51 that cannot be written or read. If the composition block 53 is generated without considering the number of defective physical blocks among the physical blocks 51 included in the media block 52, the number of defective physical blocks in the composition block 53 varies, and the write performance varies.

Thus, the memory system 1 generates composition blocks such that the number of defective physical blocks does not vary.

Before describing a method for generating the composition block 53, table information stored in the DRAM 30 by the memory system 1 will be described. The DRAM 30 of the memory system 1 stores a media block table, a composition block table, and a free block list.

FIG. 4 is a diagram illustrating a structure of a media block table in the memory system of the present embodiment. The media block table is a table in which "MB Index", "PB Indexes", "Erase Count", and "MB LinkedList" are associated with each other in the media block table of the media block and the physical block. Note that this table illustrates an example in which one media block 52 includes four physical blocks 51. For example, a media block whose "MB Index" is "0" is associated with physical blocks 51 whose physical block identification information are "PB #0", "Defect", "PB #2", and "PB #3".

Each physical block 51 is attached with identification information. The physical block 51 of which the identification information is "#l" (l is a natural number of 0 or more) is referred to as "PB #i". "PB Indexes" is a table representing identification information of the physical blocks 51 included in the media block 52. When the physical block 51 is a defective physical block, the identification information indicates "Defect". When the physical block 51 is a defective physical block, a magic value (for example, 0xFF) indicating "Defect" may be input.

"MB Index" is identification information of each media block 52. For example, the media block 52 whose identification information is "#j" (j is a natural number of 0 or more) is referred to as "MB #j".

The media block 52 of "MB #p" is associated with the physical blocks 51 of which identification information of the physical blocks are "PB #m", "Defect", "Defect", and "PB #m+1" (m is a natural number of 0 or more).

The media block 52 of "MB #0" includes one defective physical block. The media block 52 of "MB #p" includes two defective physical blocks.

"EraseCount" indicates the number of operations of erasing the data of the physical block 51 corresponding to the media block 52. When an erase command is transmitted to the NAND I/F 15, the CPU 12 counts up "EraseCount" of "MB Index" of the media block included in the composition block to be erased. In this manner, the CPU 12 stores the number of operations of erasing the data of the physical block 51 corresponding to the media block 52 in "EraseCount". That is, the media block table manages the number of erase operations in the media block 52.

"MB LinkedList" is a list indicating an anteroposterior relation of the media blocks 52 in the free block list. "Prev" of "MB LinkedList" indicates the media block 52 before the subject media block 52. "Next" in "MB LinkedList" indicates the media block 52 next to the subject media block 52.

For example, in the media block 52 of "MB #0", "Prev" of "MB LinkedList" is "null", and "Next" is "null". This indicates that the media block 52 of "MB #0" is not added to the free block list.

In the media block 52 of "MB #2", "Prev" of "MB LinkedList" is "null", and "Next" is "MB #p". This indicates that the media block 52 of "MB #2" is a free block, the media block is the head of the media blocks 52 that are free blocks, and the media block 52 of "MB #p" is present behind the media block 52 of "MB #2".

For the media block 52 of "MB #3", "Prev" of "MB LinkedList" is "MB #5", and "Next" is "null". This indicates that the media block 52 of "MB #3" is a free block, and in the free block list, the media block 52 of "MB #5" is present in front of the media block 52 of "MB #3", and the media block 52 of "MB #3" is at the end of the free block list.

For the media block 52 of "MB #5", "Prev" of "MB LinkedList" is "MB #1", and "Next" is "MB #3". This indicates that the media block 52 of "MB #5" is a free block, and in the free block list, the media block 52 of "MB #1" is present in front of the media block 52 of "MB #5", and the media block 52 of "MB #3" is present behind the media block 52 of "MB #5".

FIG. 5 is a table illustrating a composition block table of the memory system of the first embodiment. The composition block table is a table in which "CB Index" and "MB Indexes" are associated with each other.

"CB Index" is identification information of each composition block 53. "MB Indexes" is identification information of the media blocks 52 corresponding to each composition block 53. When writing data, the CPU 12 generates an entry of the composition block table before erasing the data in the free block. The composition block 53 whose "CB index" is "Y" is referred to as "CB #Y". The composition block 53 of "CB #0" has the media block 52 of "MB #0" and the media block 52 of "MB #4". "MB Indexes" of the composition block of "CB #2" is "null". This indicates that the composition block 53 of "CB #2" is unstructured. The number of entries in the composition table is determined at the time of shipment, and does not increase or decrease thereafter.

FIG. 6 is a table illustrating a free block list of the memory system of the first embodiment. The free block list is a list in which "FB Index", "Defect", and "MB LinkedList" are associated with each other. "FB Index" is identification information of the free block list. "Defect" indicates the number of defective physical blocks included in each media block belonging to the free block list. "MB LinkedList" indicates identification information of the first and last media blocks 52 among the media blocks 52 belonging to the free block list. A free block whose "FB Index" is "Z" is referred to as "FB #Z".

As illustrated in FIG. 6, the number of "FB Index" and the number of "Defect" are the same. "Defect" of the free block list of "FB #0" is "0". Thus, a media block 52 having the number of defective physical blocks of zero is added to the free block list of "FB #0". Similarly, "Defect" of the free block list of "FB #1" is "1". Thus, a media block 52 having the number of defective physical blocks of 1 is added to the free block list of "FB #1". "Head" of "MB LinkedList" indicates the "MB Index" at the head of the media blocks 52 added to the free block list. "Tail" of "MB LinkedList" indicates the "MB Index" at the end of the media blocks 52 added to the free block list.

See the free block list that is "FB #0" in FIG. 6. "Head" is "MB #1", and "Tail" is "MB #3". This indicates that the head of the free block list in which the number of defective physical blocks included in the media blocks 52 is zero is "MB #1". See the media block table of FIG. 4. "Prev" of "MB #1" is "null", and "Next" is "MB #5". The number of erase operations of "MB #1" is one. Referring to "MB #5", "Prev" of "MB #5" is "MB #1", and "Next" is "MB #3". The number of erase operations of "MB #5" is one. Referring to "MB #3", "Prev" of "MB #3" is "MB #5", and "Next" is "null". The number of erase operations of "MB #3" is two. This indicates that the first media block 52 in the free block list that is "FB #0" is "MB #1" and the last media block 52 is "MB #3", and there is a block list of "MB #5" between "MB #1" and "MB #3". Further, the plurality of media blocks 52 included in the free block list of "FB #0" are sorted by the number of erase operations.

In this manner, the memory system 1 constructs the media block table in which the media blocks 52 and the physical blocks 51 are associated with each other before generating the composition block 53 (for example, before shipment or when activated for the first time after shipment). The memory system 1 groups the media blocks by the number of defective physical blocks included in each media block to generate a free block list. The memory system 1 sorts the media blocks of each group in the free block list by the number of erase operations.

When receiving a write request from the host 2, the memory system 1 checks whether there is a composition block 53 to which data can be written. When there is no writable composition block, the memory system 1 refers to the free block list, selects the media blocks 52 such that the number of defective physical blocks becomes a predetermined number, and generates the composition block 53.

After the composition block 53 is generated, when there is no valid data in the media block included in the composition block 53 because a trim command instructing to discard data from the host 2 is received or garbage collection is performed by the memory system 1, a block release process is performed. That is, when the media blocks 52 in the composition block 53 is only the media blocks 52 having invalid data, the memory system 1 performs the block release process. The block release process is a process of, when all the data in the media blocks 52 is no longer valid data (become invalid data), treating the media blocks 52 as free blocks and adding them to the free block list. Here, the valid data is data that may be read from the host 2 later. The invalid data is data that is no longer likely to be read from the host 2.

In the block release process, the memory system 1 first adds the media block 52 included in the composition block 53 in which valid data does not exist to the free block list. That is, the memory system 1 adds media block 52 included in the composition block 53 having only invalid data to the free block list. The memory system 1 groups the media blocks 52 added to the free block list according to the number of defective physical blocks. The memory system 1 refers to the composition block table and erases the media block 52 added to the list of composition blocks 53 having only invalid data.

When generating the composition block 53, the memory system 1 selects a plurality of media blocks 52 with reference to the free block list. Of the media blocks 52 added to the free block list, there are a media block 52 in an erased state and a media block 52 having only invalid data. When the selected media blocks 52 have data, the memory system 1 increments the value of "EraseCount" of the media block 52 having data by 1, and erases the data of the physical blocks 51 included in the media block 52.

The memory system 1 may execute the block release process immediately before generating the composition block 53.

Figure 7:
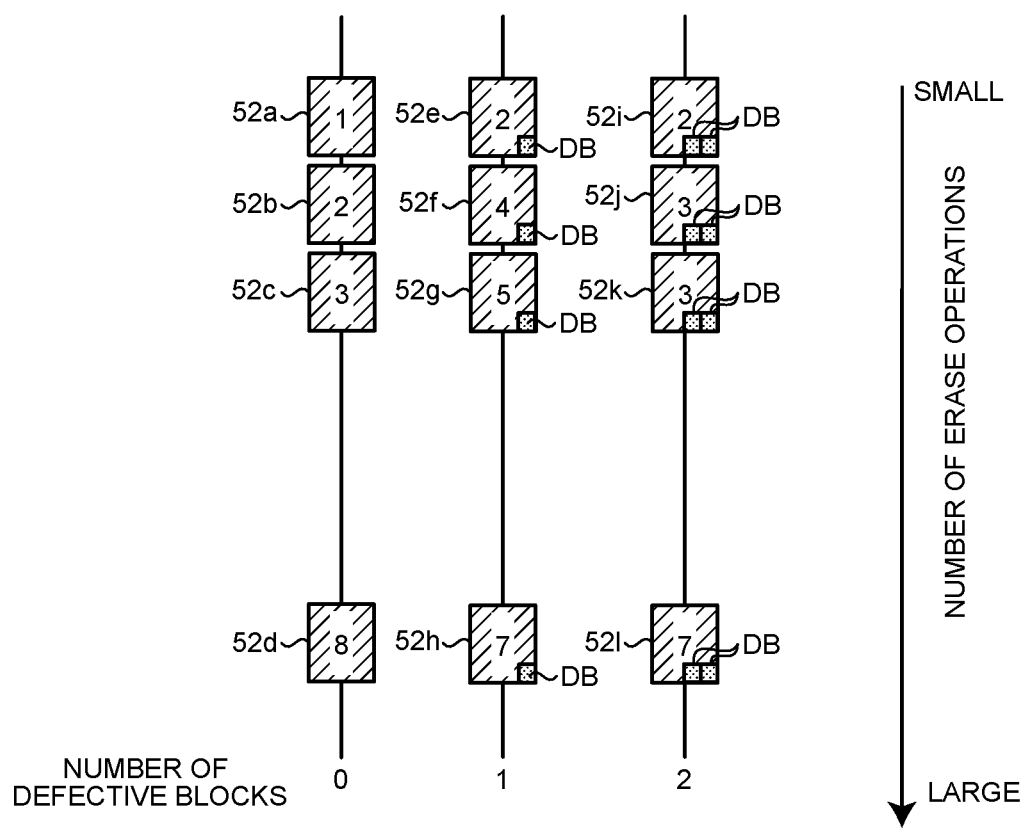
FIG. 7 is a diagram conceptually illustrating free blocks in the memory system according to the first embodiment.

Here, a method for generating the composition block 53 will be described. FIG. 7 is a block diagram illustrating the media block 52 managed by the free block list. The number attached to each of the media blocks 52a to 52l represents the number of erase operations.

The memory system 1 groups the media blocks 52 by the number of defective physical blocks included in each media block 52, and sorts the media blocks 52 of each group based on the number of erase operations. The media blocks 52a to 52d belong to a free block list in which the number of defective physical blocks is zero. The media blocks 52e to 52h belong to a free block list in which the number of defective physical blocks is one. In other words, each of the media blocks 52e to 52h includes one defective physical block DB. The free block list in which the number of defective physical blocks is two includes media blocks 52i to 52l. In other words, each of the media blocks 52i to 52l includes two defective physical blocks DB.

When generating a composition block 53 including a plurality of media blocks 52, the CPU 12 selects the media blocks 52 such that the number of defective physical blocks of each media block 52 in the composition block 53 becomes an average value. The average value is a value calculated based on the total number of physical blocks 51 in the entire NAND memory 20, the number of defective physical blocks in the entire NAND memory 20, and the number of physical blocks 51 constituting the composition block 53. For example, the memory system 1 calculates the average value of the numbers of defective physical blocks by dividing a value obtained by multiplying the number of defective physical blocks in the entire NAND memory 20 and the number of media blocks constituting the composition block by the total number of media blocks 52 in the entire NAND memory 20. The average value is an example of the reference value. When selecting a media block to generate a composition block from a plurality of media blocks having the same number of defective physical blocks, priority is given to selecting a media block with a small number of erase operations.

Figure 8:
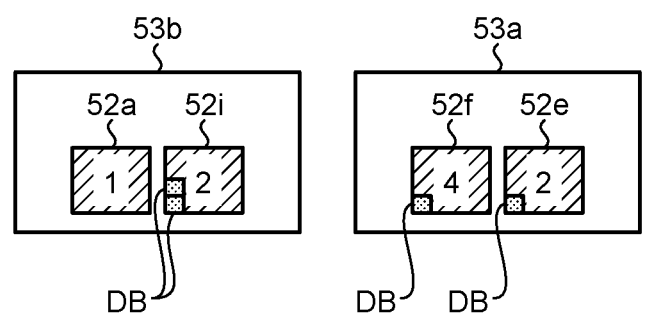
FIG. 8 is a diagram illustrating a configuration of composition blocks in the memory system according to the first embodiment.

FIG. 8 illustrates a configuration of the composition block 53 in a case where an average value of the numbers of defective physical blocks included in the composition block 53 is two. When generating the composition block 53, the CPU 12 refers to the free block list based on the calculated average value of the numbers of physical blocks 51, and selects a plurality of media blocks 52 in ascending order of the number of erase operations. In this example, the CPU 12 selects the media block 52*i* having the number of erase operations of two from the media blocks 52 having the number of defective physical blocks of two, selects the media block 52*a* having the number of erase operations of one from the media blocks having the number of defective physical blocks of zero, and generates the composition block 53*b*.

Subsequently, the CPU 12 selects the media block 52*e* having the number of erase operations of two and the media block 52*f* having the number of erase operations of four from the media blocks 52 having the number of defective physical blocks of one, and generates a composition block 53*a*. In this manner, the CPU 12 generates the composition blocks 53 in the order of the composition block 53*b* to the composition block 53*a*. This causes the number of erase operations of the block to be levelled in the long term. Selecting media blocks such that the number of defective physical blocks approaches the average value is prioritized over selecting a media block with a small number of erase operations.

Further, the media block 52*b* and a media block 52*j* having the number of erase operations of two may be selected to generate the composition block 53 in which the average value of the defective physical blocks is two.

When a plurality of combinations of media blocks 52 for generating the composition block 53 are considered, priority may be given to generating the composition block with a combination having a smaller maximum number of erase operations of media blocks in the composition block. In this case, the CPU 12 gives priority to selecting the media block 52*b* and the media block 52*j* having the number of erase operations of two, rather than selecting the media block 52*e* having the number of erase operations of two and the media block 52*f* having the number of erase operations of four.

Figure 9:
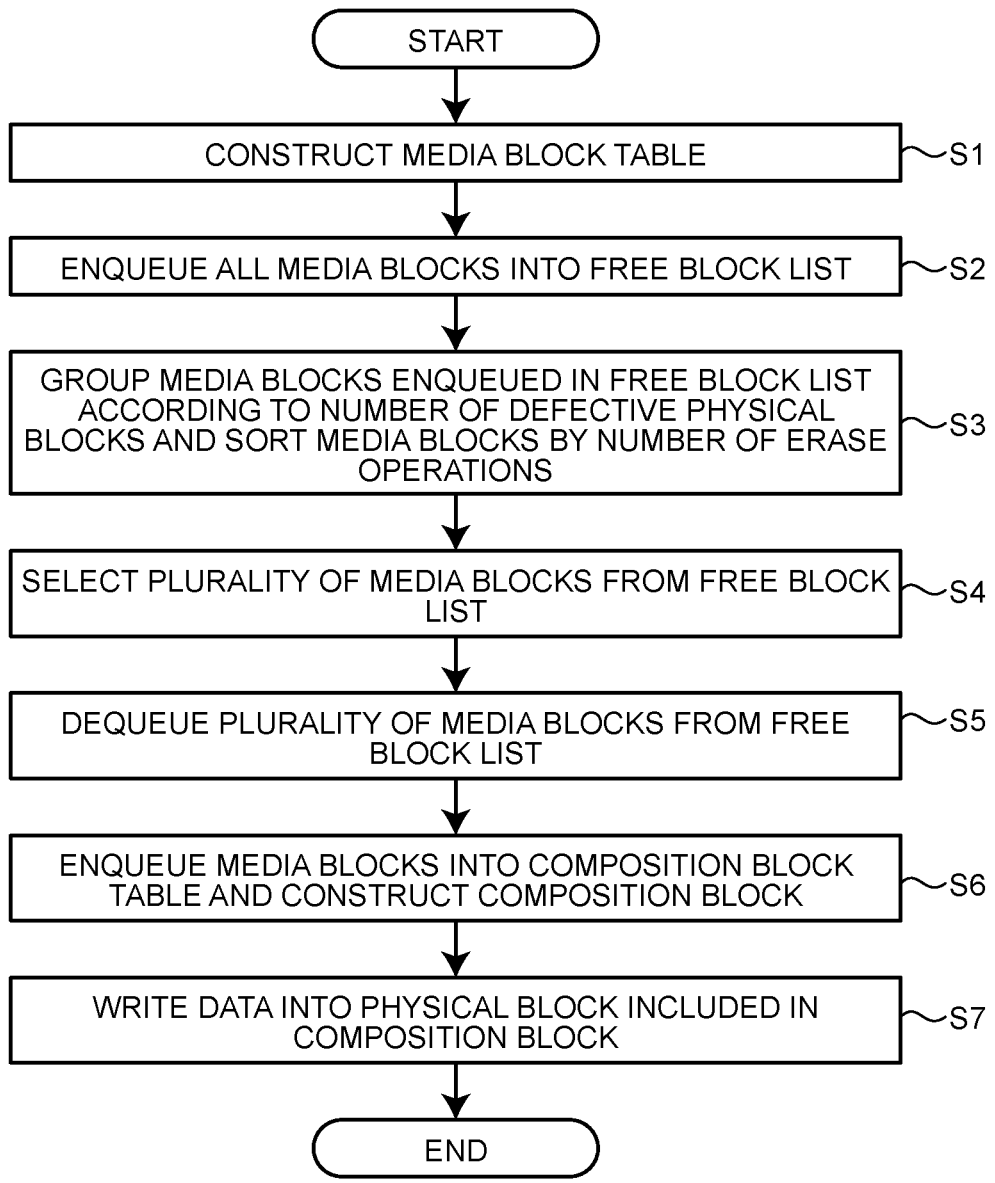
FIG. 9 is a flowchart illustrating a processing procedure of write processing at the time of first activation according to the first embodiment.

Next, a write processing procedure by the memory system 1 (more specifically, the CPU 12) according to the first embodiment will be described with reference to FIG. 9. FIG. 9 is a flowchart illustrating a processing procedure of write processing according to the present embodiment when the memory system 1 is activated for the first time.

First, the CPU 12 constructs a media block table in which the media blocks 52 and the physical blocks 51 are associated with each other at the time of first activation after manufacturing or shipment (step S1). Then, the CPU 12 enqueues all the media blocks 52 into the free block list (step S2).

The CPU 12 groups the media blocks 52 enqueued into the free block list according to the number of defective physical blocks, and sorts the media blocks by the number of erase operations (step S3). The CPU 12 selects a plurality of media blocks 52 from the free block list such that the number of defective physical blocks included in the composition block becomes a predetermined value (step S4). At this time, the media blocks 52 are selected in ascending order of the number of erase operations among the grouped media blocks. The CPU 12 dequeues the plurality of selected media blocks 52 from the free block list (step S5). The CPU 12 enqueues the dequeued media blocks 52 into the composition block table and constructs the composition block 53 (step S6). The CPU 12 writes data into the physical blocks 51 included in the composition block 53 (step S7).

Figure 10:
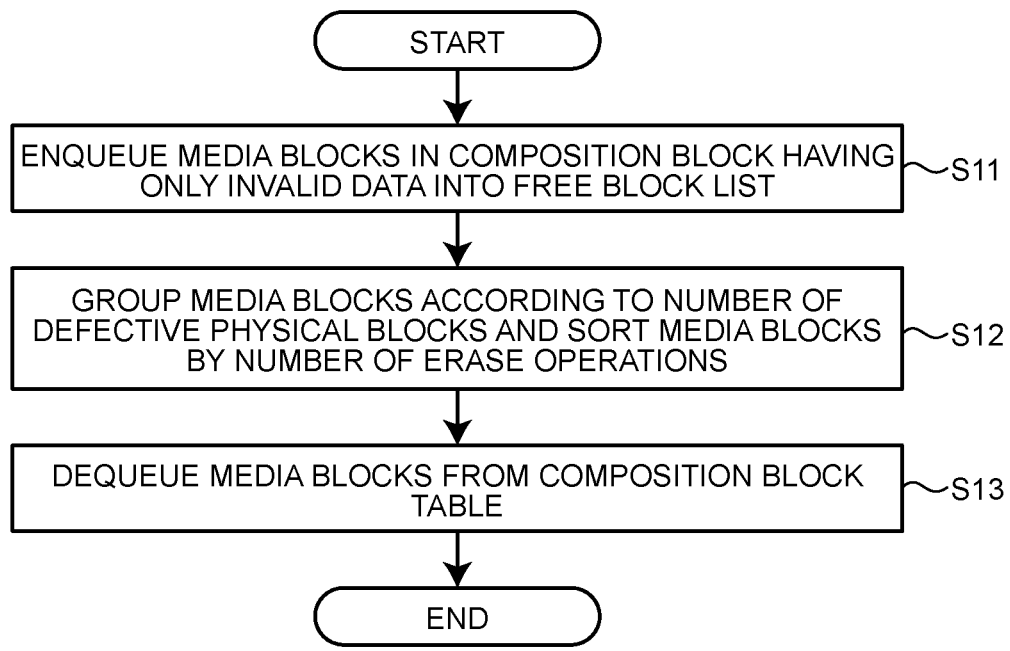
FIG. 10 is a flowchart illustrating a processing procedure of block release processing according to the first embodiment.

FIG. 10 is a flowchart of a block release processing procedure by the memory system 1 according to the first embodiment.

When all of the media blocks 52 in the composition block 53 become the media blocks 52 having only invalid data, the memory system 1 (more precisely, the CPU 12) enqueues the media blocks 52 included in the composition block 53 having only invalid data into the free block list (step S11). The CPU 12 groups the media blocks 52 enqueued into the free block list according to the number of defective physical blocks, and sorts the media blocks by the number of erase operations (step S12). The CPU 12 refers to the composition block table and dequeues the media blocks 52 enqueued into the composition block 53 having only invalid data (step S13).

Figure 11:
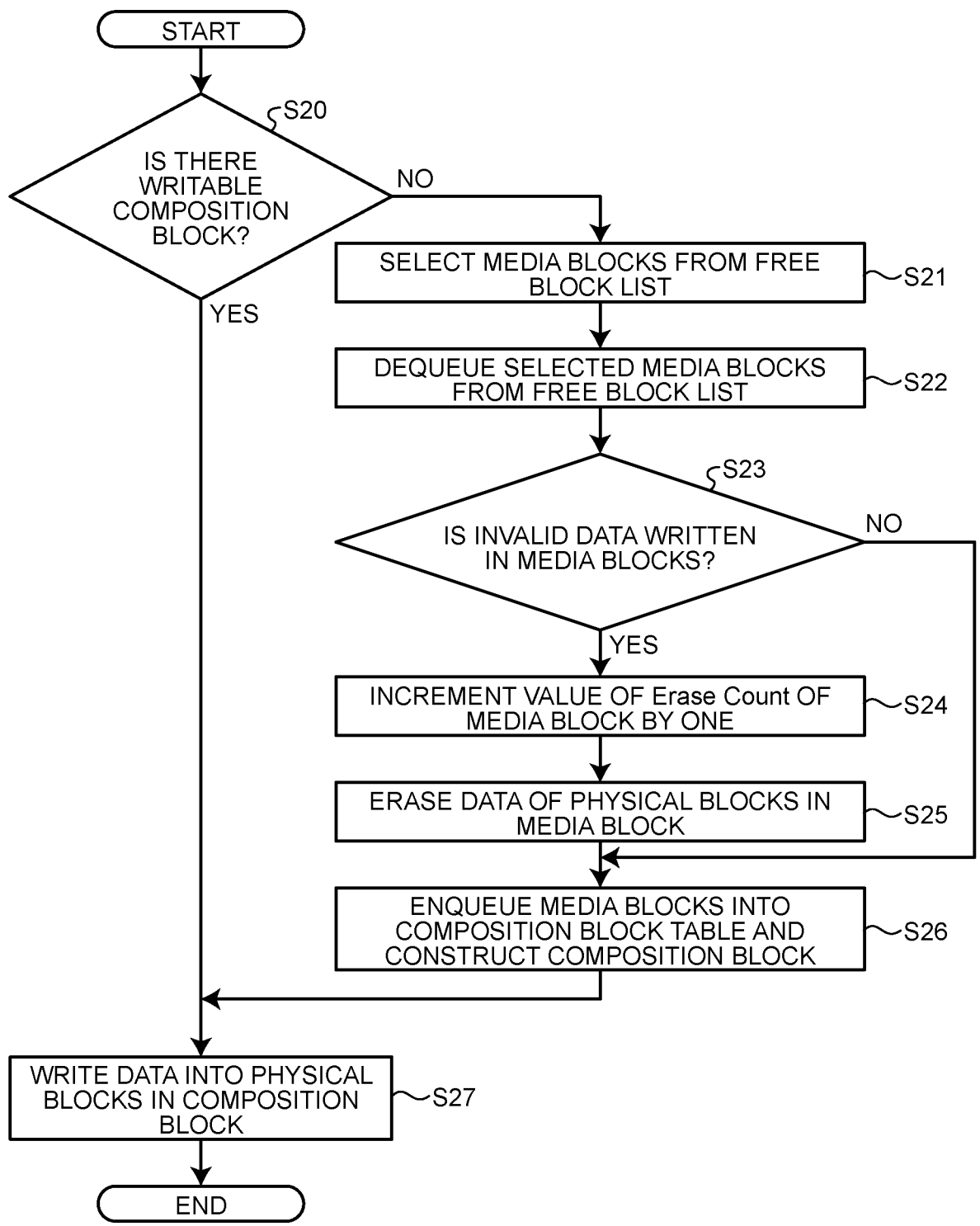
FIG. 11 is a flowchart illustrating a processing procedure of write processing after the first activation according to the first embodiment.

FIG. 11 is a flowchart of a write processing procedure by the memory system 1 according to the first embodiment.

When performing the write processing, the CPU 12 checks whether there is a composition block 53 to which data can be written (step S20). When there is a writable composition block 53 (step S20_Yes), the CPU 12 writes data into the physical blocks 51 included in the writable composition block 53 (step S27). In S20, when there is no writable composition block 53 (Step 20_No), the CPU 12 refers to the free block list and selects a plurality of media blocks 52 from the free block list such that the number of defective physical blocks included in the composition block 53 becomes a predetermined value (Step S21). At this time, the media blocks 52 are selected in ascending order of the number of erase operations among the grouped media blocks. The plurality of selected media blocks 52 are dequeued from the free block list (step S22).

The CPU 12 determines whether invalid data is written in the dequeued media blocks 52 (step S23). When invalid data is written in the dequeued media blocks 52 (step S23_Yes), the CPU 12 increments the value of "EraseCount" of the media block 52 in which the invalid data is written by one (step S24). The CPU 12 erases the data of the physical blocks 51 included in the media block 52 (step S25). The CPU 12 enqueues the selected media blocks 52 into the composition block table and constructs the composition block 53 (step S26). The CPU 12 writes data into the physical blocks 51 included in the composition block 53 (step S27).

In S23, when no invalid data is written in the selected media block 52 (when the selected media block 52 is in an erased state) (step S23_No), the CPU 12 enqueues the selected media blocks 52 into the composition block table and constructs the composition block 53 (step S26). The CPU 12 writes data into the physical blocks 51 included in the composition block 53 (step S27).

Note that, here, when there is no valid data in the media blocks 52 included in the composition block 53, the block release processing is performed each time, but the block release processing may be performed immediately before the composition block 53 is constructed.

In the first embodiment, when generating the composition block 53, the memory system 1 (more specifically, the CPU 12) groups media blocks 52 according to the number of defective physical blocks in the media blocks 52. The memory system 1 generates a free block list in which the media blocks 52 are sorted by the number of times of erase processing in the group. Then, the memory system 1 refers to the free block list and selects a plurality of media blocks of each group based on the average value of the numbers of defective physical blocks. The memory system 1 generates a composition block 53 by using the selected media block and writes data into the physical blocks 51 of the composition block 53.

Here, the memory system of Comparative Example 1 will be considered. The memory system of Comparative Example 1 generates a free block list sorted by the number of times of erase processing without considering the number of defective physical blocks in each media block. A composition block is generated by selecting a media block from the free block list. In the case of the memory system of Comparative Example 1, since the number of defective physical blocks included in each media block is not considered, the number of defective physical blocks included in the composition block may be greatly different depending on the composition block. As a result, when the write processing is executed on a composition block including many defective physical blocks, the write error rate increases and the write processing performance deteriorates.

A memory system of Comparative Example 2 will be considered. The memory system of Comparative Example 2 manages only the number of defective physical blocks included in each media block and does not consider the number of times of erase processing of the media block. The memory system of Comparative Example 2 groups the media blocks by the number of defective physical blocks included in each media block and generates a free block list. A composition block is generated by selecting a media block from the free block list. In a case where the memory system of Comparative Example 2 levels the defective physical blocks included in the composition block, the number of times of erase processing of the media block is not considered, and thus, it is impossible to level the number of erase operations of the media block included in the composition block. This causes the write processing performance to deteriorate.

On the other hand, the memory system 1 according to the first embodiment can level the number of defective physical blocks in the composition block 53 by selecting a plurality of media blocks 52 such that the number of defective physical blocks becomes an average value from the free block list grouped for each number of defective physical blocks.

In addition, the memory system 1 calculates the average value based on the total number of media blocks 52 in the entire NAND memory 20, the number of defective physical blocks in the entire NAND memory 20, and the number of media blocks constituting the composition block. In this manner, the memory system 1 can level the number of defective physical blocks in the composition block 53 by using the average value of the numbers of defective physical blocks in the media blocks 52 in the composition block 53 as a reference value.

Further, the number of erase operations of the media blocks 52 included in the composition block 53 can be leveled by sorting the media blocks 52 based on the number of times of erase processing of the media blocks 52 and generating a free block list.

The embodiment described above can stabilize the write processing performance of the memory system 1.

Second Embodiment

In the first embodiment, a case where the memory system 1 selects the media block 52 such that the number of defective physical blocks included in one composition block 53 becomes a predetermined value when the memory system 1 generates the composition block 53 has been described.

The memory system 1 of the first embodiment cannot select a free block list with defective physical blocks exceeding the average value to generate the composition block 53. That is, when the average value is, for example, two, the CPU 12 cannot select the free block list in which the number of defective physical blocks is three.

Accordingly, the memory system 1 of the second embodiment generates the composition block 53 in consideration of the average in the cycle of the number of defective physical blocks included in a group of a plurality of composition blocks 53. The group of a plurality of composition blocks 53 is set as a cyclic composition block 531. The memory system 1 includes a cyclic composition block table.

A value obtained by dividing the maximum number of defective physical blocks included in a media blocks by an average value of the numbers of defective physical blocks included in the media blocks and rounding up the result to an integer value is set as a cyclic value. The CPU 12 selects the media block 52 from the free block list such that the number of defective physical blocks included in the cyclic composition block 531 becomes a cyclic value.

Figure 12:
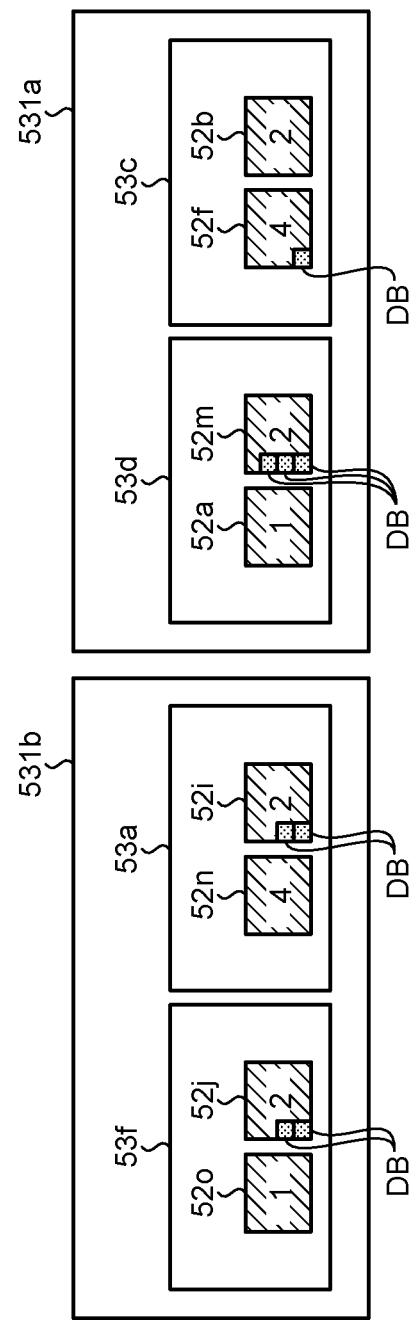
FIG. 12 is a diagram illustrating an example of composition blocks based on a cycle according to a second embodiment.

FIG. 12 is a block diagram illustrating a configuration of a cyclic composition block of the memory system according to the second embodiment. An example of generating a cyclic composition block 531a and a cyclic composition block 531b will be described. In this example, the CPU 12 determines the number of the composition blocks 53 included in the cyclic composition block 531 as two and the cyclic value as two, and generates the cyclic composition block 531a and the cyclic composition block 531b. The CPU 12 can freely determine the number of composition blocks 53 included in the cyclic composition block 531 as long as the number of defective physical blocks included in the cyclic composition block 531 is equal to or larger than the cyclic value.

First, the CPU 12 selects a media block 52i having the number of defective physical blocks of two and a media block 52n having the number of defective physical blocks of zero from the free block list and generates a composition block 53a. Then, the CPU 12 selects a media block 52j having the number of defective physical blocks of two and a media block 52o having the number of defective physical blocks of zero from the free block list and generates a composition block 53f. The CPU 12 adds the composition block 53a and the composition block 53f to the cyclic composition block table. The average value of the numbers of defective physical blocks in the cyclic composition block 531b is two.

Subsequently, the CPU 12 selects a media block 52b having the number of defective physical blocks of zero and a media block 52f having the number of defective physical blocks of one from the free block list and generates a composition block 53c. Then, the CPU 12 selects a media block 52m having the number of defective physical blocks of three and a media block 52a having the number of defective physical blocks of zero from the free block list and generates a composition block 53d. The CPU 12 adds the composition block 53d and the composition block 53c to the cyclic composition block table. In this case, the average value of the numbers of defective physical blocks in the cyclic composition block 531a is two.

Note that, since the number of defective physical blocks in the media block 52 increases as time elapses or the number of times of writing/erasing increases, the memory system 1 may recalculate the cyclic value every time a predetermined period elapses. That is, the memory system 1 may dynamically calculate the cyclic value and reflect the calculated cyclic value when generating the cyclic composition block 531.

Figure 13:
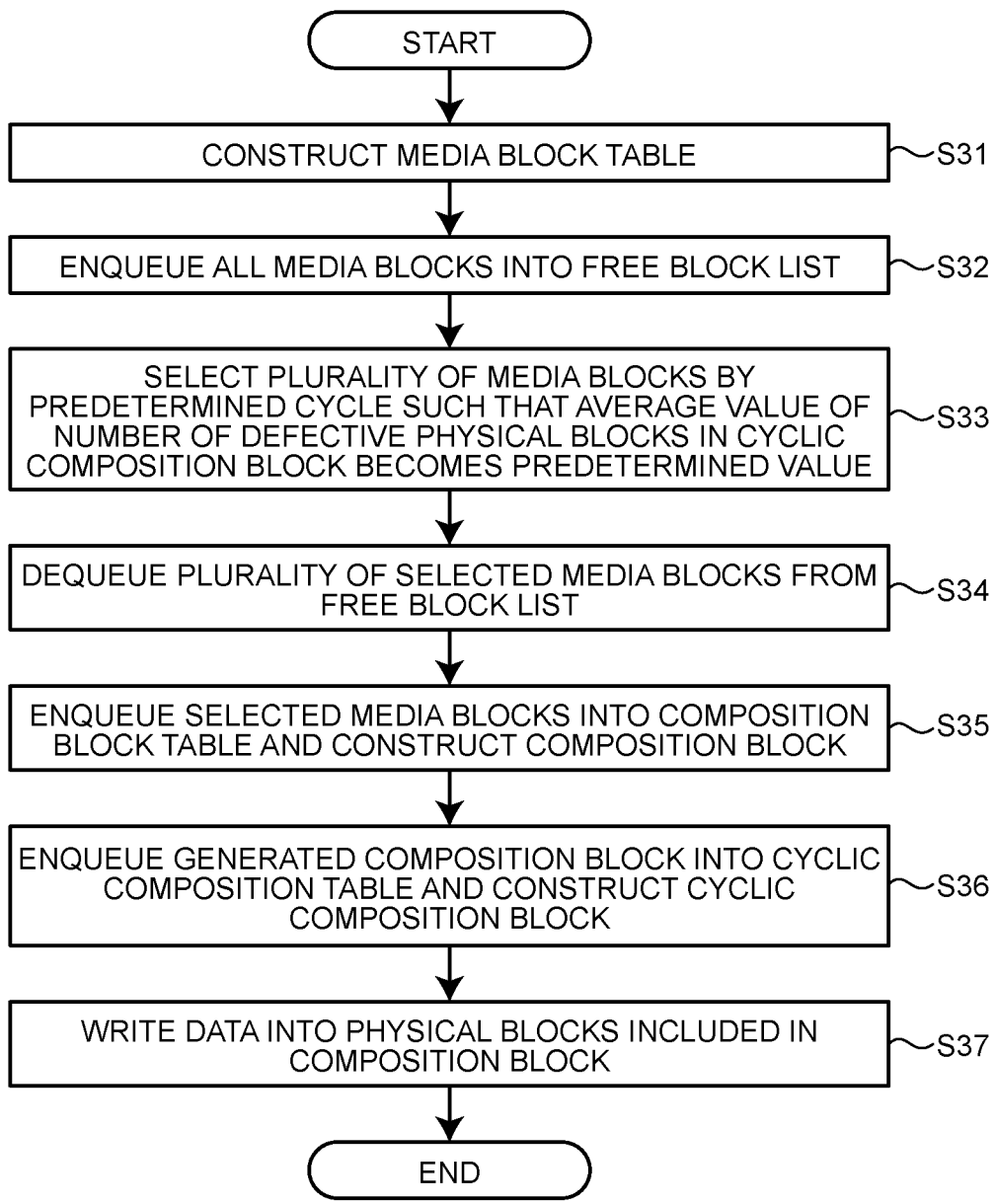
FIG. 13 is a flowchart illustrating a processing procedure of write processing at the time of first activation according to the second embodiment.

FIG. 13 is a flowchart illustrating a processing procedure of write processing according to the second embodiment. A write processing procedure by the memory system 1 according to the second embodiment will be described with reference to FIG. 13.

First, the CPU 12 of the memory system 1 constructs a media block table in which the media blocks 52 and the physical blocks 51 are associated with each other at the time of first activation after manufacturing or shipment (step S31). Then, the CPU 12 enqueues all the media blocks 52 into the free block list (step S32).

The CPU 12 selects a plurality of media blocks 52 from the free block list such that the average value of the numbers of defective physical blocks included in the cyclic composition block 531 becomes a predetermined value (step S33). At this time, the media blocks 52 are selected in ascending order of the number of erase operations among the grouped media blocks. The CPU 12 dequeues the plurality of selected media blocks 52 from the free block list (step S34). The CPU 12 enqueues the dequeued media blocks 52 into the composition block table and constructs the composition block 53 (step S35). The CPU 12 enqueues the generated composition block into the cyclic composition table and constructs the cyclic composition block 531 (step S36). The CPU 12 writes data into the physical blocks 51 included in the composition block 53 (step S37).

Figure 14:
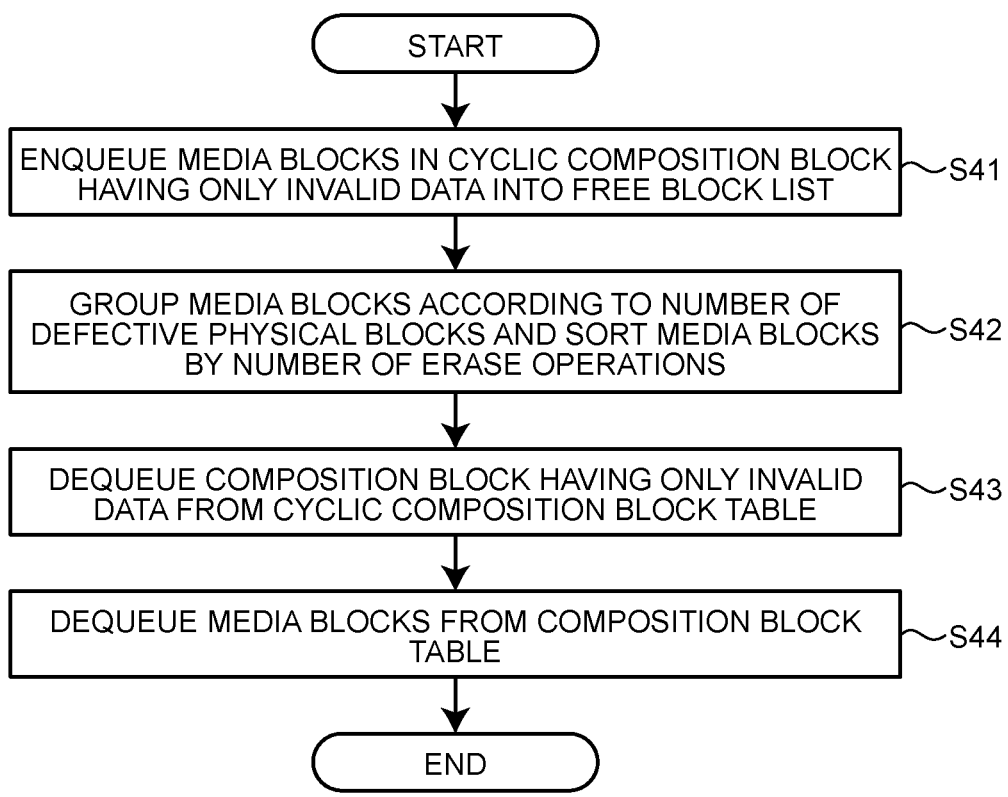
FIG. 14 is a flowchart illustrating a processing procedure of block release processing according to the second embodiment.

FIG. 14 is a flowchart of a block release processing procedure by the memory system 1 according to the second embodiment. The block release processing procedure will be described with reference to the flowchart of FIG. 14.

When all of the media blocks 52 in the cyclic composition block 531 are only media blocks having only invalid data, the CPU 12 enqueues the media blocks 52 included in the cyclic composition block 531 having only invalid data into the free block list (step S41). The CPU 12 groups the media blocks 52 enqueued into the free block list according to the number of defective physical blocks, and sorts the media blocks by the number of erase operations (step S42). The CPU 12 refers to the cyclic composition block table and dequeues the composition block 53 having only invalid data (step S43). The CPU 12 refers to the composition block table and dequeues the media blocks 52 enqueued into the composition block 53 having only invalid data (step S44).

Figure 15:
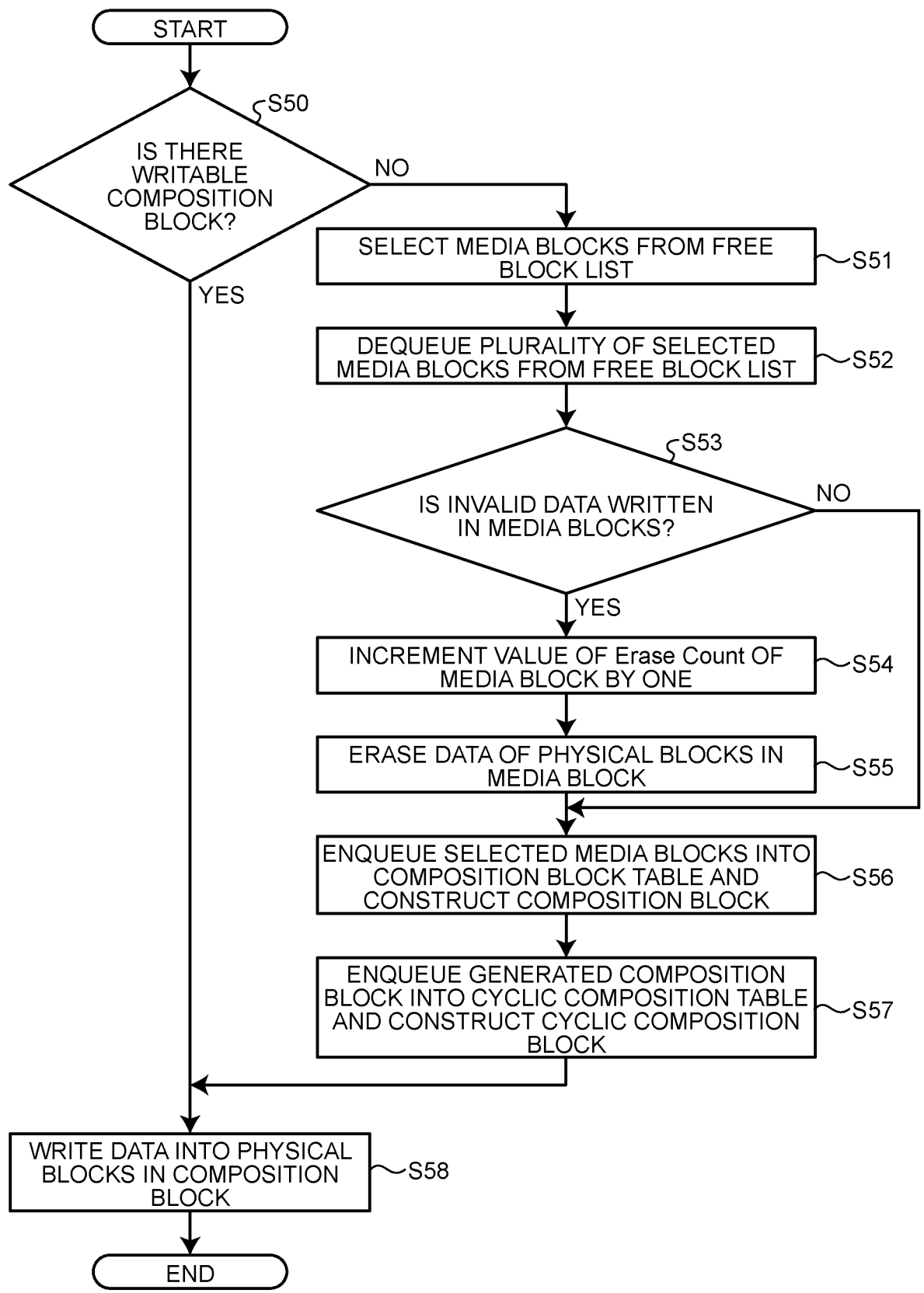
FIG. 15 is a flowchart illustrating a processing procedure of write processing after the first activation according to the second embodiment.

FIG. 15 is a flowchart illustrating a processing procedure of the write processing according to the present embodiment of the memory system 1 after the first activation. The write processing procedure by the memory system 1 according to the second embodiment will be described with reference to FIG. 15.

When performing the write processing, the CPU 12 checks whether there is a composition block 53 to which data can be written (step S50). When there is a writable composition block 53 (step S50_Yes), the CPU 12 writes data into the physical blocks 51 included in the writable composition block 53 (step S58). In S50, when there is no writable composition block 53 (Step 50_No), the CPU 12 refers to the free block list and selects a plurality of media blocks 52 from the free block list such that the number of defective physical blocks included in the composition block 53 becomes a predetermined value (Step S51). At this time, the media blocks 52 are selected in ascending order of the number of erase operations among the grouped media blocks. The plurality of selected media blocks 52 are dequeued from the free block list (step S52).

The CPU 12 checks whether invalid data is written in the dequeued media blocks 52 (step S53). When invalid data is written in the dequeued media blocks 52 (step S53_Yes), the CPU 12 increments the value of "EraseCount" of the media block 52 in which the invalid data is written by one (step S54). The CPU 12 erases the data of the physical blocks 51 included in the media block 52 (step S55). The CPU 12 enqueues the selected media blocks 52 into the composition block table and constructs the composition block 53 (step S56). The CPU 12 enqueues the generated composition block into the cyclic composition table and constructs the cyclic composition block 531 (step S57). The CPU 12 writes data into the physical blocks 51 included in the composition block 53 (step S58).

In S53, when no invalid data is written in the selected media block 52 (when the selected media block 52 is in an erased state) (step S53_No), the CPU 12 enqueues the selected media blocks 52 into the composition block table and constructs the composition block 53 (step S56). The CPU 12 enqueues the generated composition block into the cyclic composition table and constructs the cyclic composition block 531 (step S57). The CPU 12 writes data into the physical blocks 51 included in the composition block 53 (step S58).

Note that, here, when there is no valid data in the media blocks 52 included in the composition block 53, the block release processing is performed each time, but the block release processing may be performed immediately before the composition block 53 is constructed.

In the second embodiment, the memory system 1 generates the cyclic composition block 531 such that the number of defective physical blocks included in each of the predetermined number of cyclic composition blocks 531 becomes a cyclic value. In this case, even when there is a media block 52 with defective physical blocks exceeding the average value, the memory system 1 can select the media block 52 and generate the composition block 53.

The memory system 1 determines the cyclic value based on the maximum number of defective physical blocks included in the media block 52. This allows the memory system 1 to level the number of defective physical blocks included in each of the cyclic composition blocks 531 even when a media block 52 with a large number of defective physical blocks is selected.

In addition, the memory system 1 may determine the cyclic value for each predetermined period. This period is a period in which the number of defective physical blocks is considered to increase as the time elapses or a period in which the number of erase operations of the media block 52 is considered to increase by a predetermined number. The memory system 1 may include a timer therein and determine that a predetermined period has elapsed. This allows the memory system 1 to level the number of defective physical blocks included in each of the composition blocks 53 with an increased number of defective physical blocks.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system comprising:
a non-volatile memory including a plurality of physical blocks; and
a controller,
the controller being configured to:
allocate the plurality of physical blocks to a plurality of first block sets each including physical blocks among the plurality of physical blocks;
generate a plurality of groups, each of the plurality of groups including at least two of the plurality of first block sets, the at least two first block sets included in each group having the same number of defective physical blocks;
select at least one of the at least two first block sets from at least two groups of the plurality of groups; and
generate a second block set which includes the selected first block sets.

2. The memory system according to claim 1, wherein the controller is configured to:
sort the first block sets by the number of erase operations; and
generate a list of the first block sets sorted by the number of erase operations for each of the plurality of groups.

3. The memory system according to claim 2, wherein the controller is configured to:
calculate a reference value of the defective physical blocks; and
generate the second block set based on the reference value with reference to the list.

4. The memory system according to claim 3, wherein the controller is configured to calculate the reference value based on the number of the first block sets in an entirety of the non-volatile memory, the number of defective physical blocks in the entirety of the non-volatile memory, and the number of the first block sets in the second block set.

5. The memory system according to claim 1, wherein the controller is configured to generate the second block set based on a correction code length of data to be written to the physical block.

6. The memory system according to claim 2, wherein the controller is configured to, during write processing:
update the list for the first block sets included in the second block set that is erasable; and
generate a second block set obtained by selecting a plurality of the first block sets from the plurality of groups based on a reference value of the defective physical blocks.

7. The memory system according to claim 6, wherein
the list includes the number of erase operations for the first block sets, and
the number of erase operations for the first block sets included in the second block set that is erasable is incremented by one when the list is updated.

8. The memory system according to claim 1, wherein the controller is configured to:
generate a plurality of third block sets each including a plurality of the second block sets; and
select the second block sets such that the number of defective physical blocks included in the third block sets becomes a cyclic value.

9. The memory system according to claim 8, wherein the cyclic value is determined based on a maximum number of the defective physical blocks of the second block sets.

10. The memory system according to claim 8, wherein the cyclic value is updated every predetermined period.

11. The memory system according to claim 1, wherein the controller is configured to generate the second block set during write processing of the non-volatile memory.

12. A control method executed in a memory system,
the memory system comprising a non-volatile memory including a plurality of physical blocks,
the method comprising:
allocating the plurality of physical blocks to a plurality of first block sets each including physical blocks among the plurality of physical blocks;
generating a plurality of groups, each of the plurality of groups including at least two of the plurality of first block sets, the at least two first block sets included in each group having the same number of defective physical blocks;
selecting at least one of the at least two first block sets from at least two groups of the plurality of groups; and
generating a second block set which includes the selected first block sets.

13. The control method according to claim 12, the method comprising:
sorting the first block sets by the number of erase operations; and
generating a list of the first block sets sorted by the number of erase operations for each of the plurality of groups.

14. The control method according to claim 13, the method comprising:
calculating a reference value of the defective physical blocks; and
generating the second block set based on the reference value with reference to the list.

15. The control method according to claim 13, the method comprising calculating the reference value based on the number of the first block sets in an entirety of the non-volatile memory, the number of defective physical blocks in the entirety of the non-volatile memory, and the number of the first block sets in the second block set.

16. The control method according to claim 12, the method comprising generating the second block set based on a correction code length of data to be written to the physical block.

17. The control method according to claim 13, the method comprising, during write processing:
updating the list for the first block sets included in the second block set that is erasable; and
generating a second block set obtained by selecting a plurality of the first block sets from the plurality of groups based on a reference value of the defective physical blocks.

18. The control method according to claim 17, wherein
the list includes the number of erase operations for the first block sets, and
the number of erase operations for the first block sets included in the second block set that is erasable is incremented by one when the list is updated.

19. The control method according to claim 12, the method comprising:
generating a plurality of third block sets each including a plurality of the second block sets; and
selecting the second block sets such that the number of defective physical blocks included in the third block sets becomes a cyclic value.

20. The control method according to claim 19, wherein the cyclic value is determined based on a maximum number of the defective physical blocks of the second block sets.

21. The control method according to claim 19, the method comprising updating the cyclic value every predetermined period.

22. The control method according to claim 12, the method comprising generating the second block set during write processing of the non-volatile memory.

* * * * *